(12) United States Patent
Audrezet et al.

(10) Patent No.: US 8,348,350 B2
(45) Date of Patent: Jan. 8, 2013

(54) TWO-STAGE ELECTROMECHANICALLY CONTROLLED BRAKING SYSTEM FOR A MULTIAXLE ROAD VEHICLES

(75) Inventors: Arnaud Audrezet, Strasbourg (FR); Jean-Luc Andre, Molsheim (FR)

(73) Assignee: Lohr Industrie, Hangenbieten (FR)

( * ) Notice: Subject to any disclaimer, the term of this patent is extended or adjusted under 35 U.S.C. 154(b) by 1220 days.

(21) Appl. No.: 12/096,398

(22) PCT Filed: Dec. 5, 2006

(86) PCT No.: PCT/FR2006/002649
§ 371 (c)(1),
(2), (4) Date: Jun. 6, 2008

(87) PCT Pub. No.: WO2007/065994
PCT Pub. Date: Jun. 14, 2007

(65) Prior Publication Data
US 2008/0309155 A1 Dec. 18, 2008

(30) Foreign Application Priority Data
Dec. 6, 2005 (FR) ..................................... 05 12372

(51) Int. Cl.
*B60T 7/00* (2006.01)

(52) U.S. Cl. ................. 303/15; 303/3; 303/7; 303/118.1

(58) Field of Classification Search .................... 303/15, 303/3, 7, 18, 20, 25, 28, 113.4, 118.1
See application file for complete search history.

(56) References Cited

U.S. PATENT DOCUMENTS

| | | | |
|---|---|---|---|
| 2,103,352 A | 12/1937 | Farmer et al. | |
| 2,132,935 A | 10/1938 | Bush | |
| 4,616,881 A * | 10/1986 | Muller et al. | 303/7 |
| 4,919,492 A * | 4/1990 | Samuelson et al. | 305/3 |
| 5,002,343 A * | 3/1991 | Brearley et al. | 303/7 |
| 5,738,418 A * | 4/1998 | Stumpe et al. | 303/15 |
| 6,000,765 A * | 12/1999 | Hinz et al. | 303/148 |
| 6,058,705 A * | 5/2000 | Schunck | 60/562 |
| 6,202,018 B1 * | 3/2001 | Stumpe et al. | 701/70 |
| 6,206,481 B1 * | 3/2001 | Kaisers et al. | 303/7 |
| 6,502,028 B2 * | 12/2002 | Sato | 701/70 |
| 6,554,089 B2 * | 4/2003 | Sato et al. | 180/169 |
| 7,210,049 B2 * | 4/2007 | Disser | 713/324 |
| 2004/0119333 A1 * | 6/2004 | Hackl | 303/125 |
| 2005/0225168 A1 * | 10/2005 | Nakamura et al. | 303/119.2 |

FOREIGN PATENT DOCUMENTS

GB 477 333 12/1937

* cited by examiner

*Primary Examiner* — Robert A Siconolfi
*Assistant Examiner* — Mariano Sy
(74) *Attorney, Agent, or Firm* — Davis & Bujold, PLLC

(57) ABSTRACT

A brake system (1) having a number of sub-assemblies including a foot brake pedal (14) whose two stages correspond to service and emergency modes. Pneumatic brake modules (6) are assigned to each axle and have a proportional solenoid valve EVP (9). At least one deceleration controlling UCD unit (12) receives information from the pedal related to the pedal's position and electrically controls the brake motor (31) and/or the EVP in the service and emergency modes. A pneumatic control circuit, which is actuated in the emergency mode, controls the EVP directly from the pneumatic box (19) of the pedal. The brake system (1) is suitable for articulated multi-axle road vehicles and used, in particular, for passenger transport.

22 Claims, 7 Drawing Sheets

TWO-STAGE ELECTROMECHANICALLY CONTROLLED BRAKING SYSTEM FOR A MULTIAXLE ROAD VEHICLES

This is a national stage completion of PCT/FR2006/002649 filed Dec. 5, 2006 which claims priority from French Application Serial No. 0512372 filed Dec. 6, 2005.

FIELD OF THE INVENTION

The present invention relates to a two-stage, electromechanically controlled braking system for a multi-axle road vehicle, in particular used in the context of public transport.

A particular application concerns a multi-axle train on tires for public transport, comprising a self-steering unit.

BACKGROUND OF THE INVENTION

Road vehicles for passenger transport are generally provided with a very powerful braking system that enables them to be stopped quickly. This braking system is classically a pneumatically controlled pneumatic braking system. Such a system, available on the market, is perfectly reliable and safe.

However, under normal conditions of use, if the driver actuates such a system somewhat abruptly, the public transport vehicle also stops abruptly and this can be very uncomfortable for the passengers, even causing them to lose their balance or fall over.

In effect abrupt braking, besides startling the passenger, tends to throw them forward. Since the passengers are not attached to their seat and are even often standing, they can be thrown against a structural element of the vehicle or even fall over. Accordingly, such braking causes many traumas for passengers, both psychological and physical.

To avoid such annoyances the driver must therefore always control the braking applied by anticipating and actuating the braking control element, generally a brake pedal, very progressively and gently. With the classical braking system it is rather difficult for the driver to ensure maximum passenger comfort by gentle driving with no jerky stops, which demands a lot of effort and attention on his part.

SUMMARY OF THE INVENTION

One of the present invention's objectives is to provide a braking system suitable for public transport vehicles, which ensures progressive and moderate braking that guarantees the comfort and safety of passengers. Such a progressive system can perfectly well be envisaged in this type of application, the more so since public transport vehicles generally circulate in reserved lanes, i.e. with no circulation constraints in relation to other vehicles. The driver therefore knows exactly where and when his vehicle has to stop, and can accordingly anticipate the operations of deceleration and braking.

A further disadvantage of the classical, pneumatically controlled braking system is its slow response time. In effect, in a long vehicle and in particular a public transport train with several carriages and thus several axles, the propagation of the pneumatic control along the whole vehicle takes a certain amount of time.

Whereas the brake elements on the first axles come into action a short time after a braking command has been given by the driver, those at the other end of the vehicle are actuated after a fairly substantial delay. Such a situation reduces the efficacy of the resultant braking, produces uneven wear of the brake mechanisms, and induces unsatisfactory dynamic behavior of the vehicle.

A further objective of the invention is to provide a braking system that is perfectly effective, has a much shorter response time, and produces less and also better-distributed wear of the brake mechanisms. Thanks to such a system the dynamic behavior of the vehicle is optimized in order to ensure the greatest possible comfort and safety of the passengers.

In the event of unforeseen danger, however, the need for emergency braking remains essential. In effect, even through public transport vehicles generally circulate in reserved lanes, it can happen that a pedestrian, a vehicle or any other unexpected obstacle, momentarily present in the lane, demands emergency braking.

Such emergency braking must be completely reliable and must enable the vehicle to be stopped within a very short distance without being too inconvenient for the passengers.

Pneumatically controlled pneumatic braking is perfectly reliable and safe. The braking system according to the invention still uses that type of braking for the emergency braking, while overcoming its disadvantages. It also enables the response time to be reduced and ensures complete efficacy of the resultant braking.

Thus, for multi-axle road vehicles there is need for a pneumatic braking system which enables both progressive and moderate service braking, and reliable and effective emergency braking, while ensuring the comfort and safety of passengers.

To solve this technical problem the invention provides an electromechanically controlled braking system for a multi-axle road vehicle, which comprises for each axle a pneumatic braking module connected to a feed reservoir containing brake-actuating gas and comprising brake actuation elements.

This braking system comprises;

a manual element, preferably a brake pedal, with two operating stages that correspond respectively to a service mode and to an emergency braking mode, which is actuated by the driver of the vehicle to initiate the braking process and whose position determines the intensity of the braking called for;

a proportional solenoid valve EVP for each braking module which, when the manual element is actuated, receives an electric and/or a pneumatic braking command, and whose opening, which is proportional to the command(s) received, brings the brake actuation elements into communication with the feed reservoir so as to produce the braking force required;

at least one deceleration control unit UCD which receives information about the position of the manual element and, from that position when the manual element has been actuated, generates an electric braking command designed for the electric control of the opening of the solenoid valves EVP;

an electric control line for each braking module, which forms an electric connection between the UCD unit and each of the solenoid valves EVP and enables the transmission of the electric command;

a pneumatic control line which forms a pneumatic connection between the manual element and the solenoid valves EVP and enables the transmission of a pneumatic command generated by the manual element, solely when operating in the emergency braking mode.

Advantageously, the UCD unit can also control the electrodynamic braking by the engines of the vehicle, also known as the engine brake, in such manner that the UCD gives priority preferentially to the engine brake, if necessary supplementing it or replacing it by the pneumatic braking if it is insufficient or ineffective.

BRIEF DESCRIPTION OF THE DRAWINGS

Other characteristics and advantages of the invention will emerge from the description below, which is given as an example and goes together with the following figures.

DETAILED DESCRIPTION OF THE INVENTION

The braking system according to the present invention will now be described in detail, with reference to FIGS. 1 to 8. Equivalent elements shown in the various figures are given the same index numbers.

The present invention relates to an electromechanically controlled braking system for a multi-axle articulated road vehicle, in particular for carrying passengers. Clearly, that application is only an example and many other applications in multi-axle ground vehicles are possible.

Figure 3:
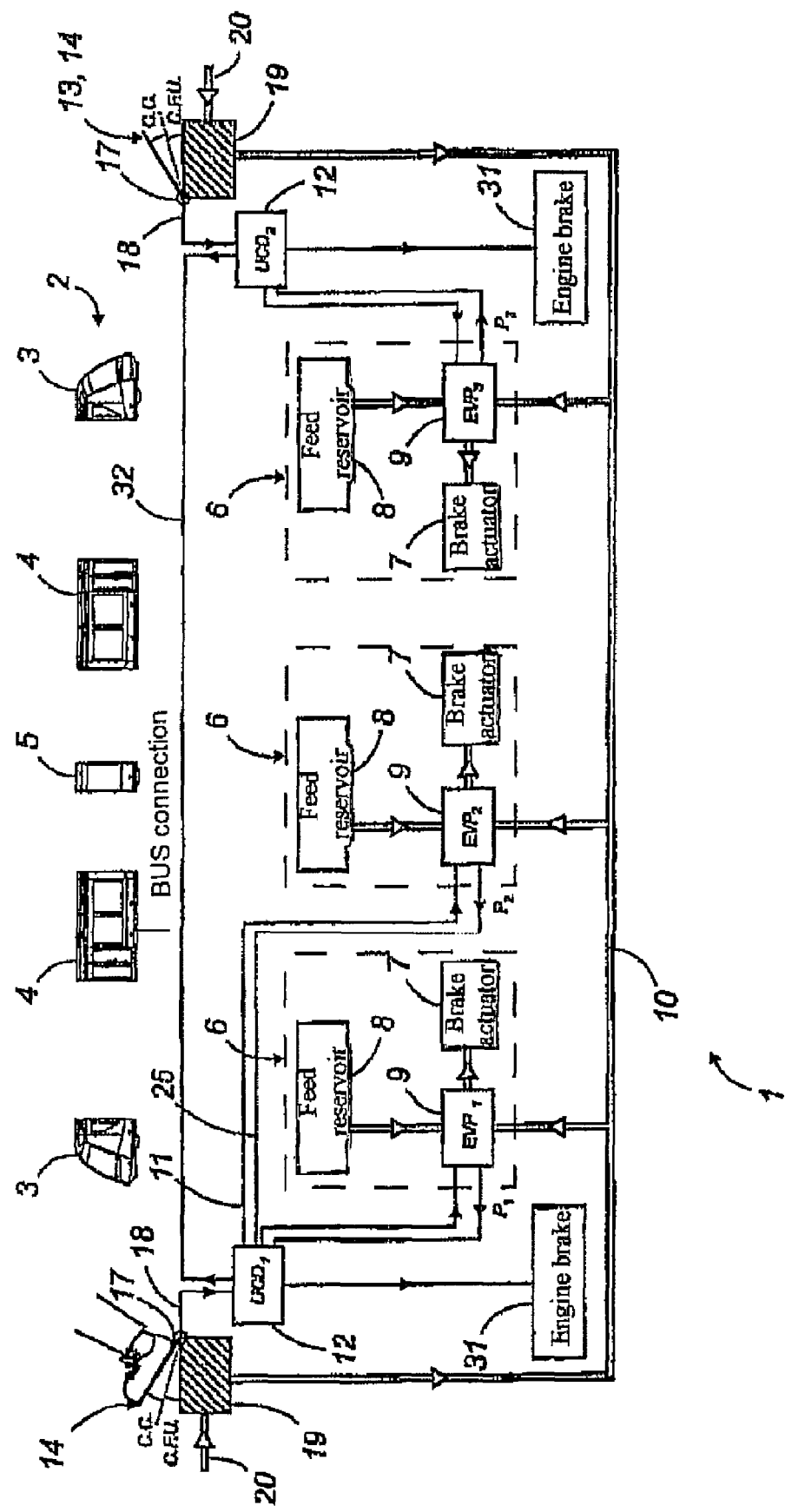
FIG. 3 is a general functional block diagram of another example braking system according to the invention, with three braking modules and a brake pedal at each end of the vehicle.
Figure 4:
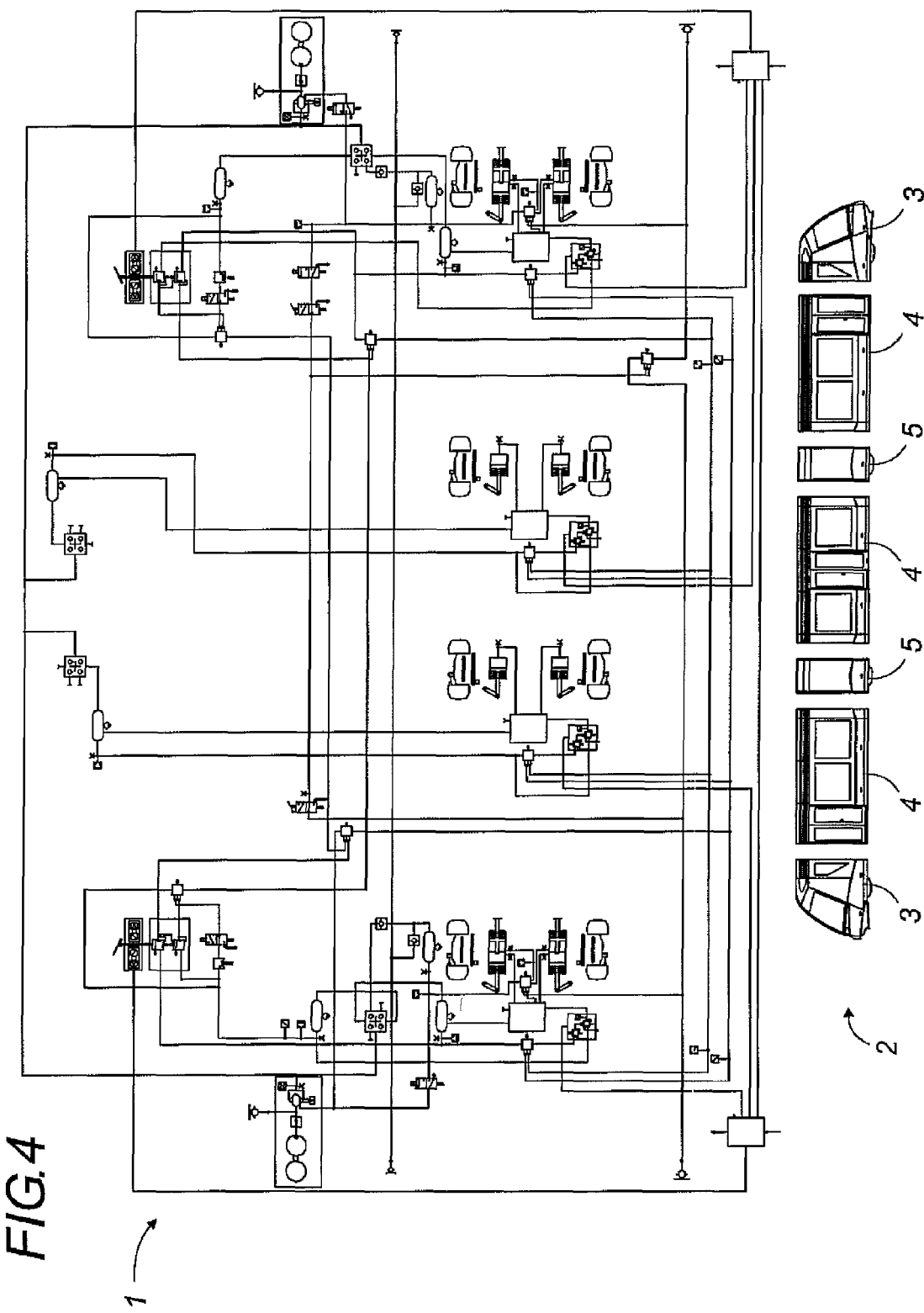
FIG. 4 is a more detailed electromechanical diagram corresponding to another example braking system according to the invention, with four braking modules and two deceleration control units.

Referring to FIGS. 3 and 4, the braking system 1 according to the invention is designed more particularly for installation on a preferably multi-axial road train 2 for public transport. This train 2 consists of a plurality of road modules articulated to one another, with at least one head module 3, and one or more carriages 4 intended for passenger transport and carried by intermediate modules such as 5, each having an axle.

Classically, the train 2 preferably has a head module 3 at each end, enabling it to travel alternatively in both directions without having to make a U-turn.

According to the invention each axle is equipped with a pneumatic braking module or assembly 6.

Each braking module 6 comprises an assembly of classical pneumatic braking devices that act upon disks or other surfaces attached to the wheels. These devices comprise pneumatic brake actuators 7 and act individually on each of the two wheels of an axle by virtue of driving pneumatic energy that comes from a reservoir of brake-actuating gas, also called the feed reservoir 8, the actuating gas preferably being compressed air.

Preferably, each braking module 6 is connected to an independent feed reservoir 8 of brake-actuating gas, preferably arranged on the roof of the associated vehicle 4. Thus, each braking module 6 is independent of the others so far as its pneumatic energy supply is concerned, which advantageously enables a module to be isolated in the event of leakage or malfunction.

However, it is also perfectly conceivable to use a common feed reservoir for all the braking modules 6, or several reservoirs distributed along the train 2, each supplying one or more braking modules 6.

These reservoirs 8 are preferably filled with compressed air coming from a generator, which may or may not be common to them all.

Preferably, one or more of the braking modules 6 also comprise known safety elements such as an anti-skid and/or anti-wheel-lock system, a wheel symmetry system, a load compensation system that modulates the braking force as a function of the axle weight, or any other appropriate system. These safety elements are preferably subsumed in a braking control and stabilization unit which preferably forms part of the elements 7 that actuate the braking mechanisms for each axle by virtue of the compressed air reservoir 8 and a braking command.

According to an essential feature of the invention, each of the braking modules 6 also comprises a proportional solenoid valve EVP 9. When there are several proportional solenoid valves (and thus several braking modules 6), these are indexed $EVP_1, EVP_2, \ldots EVP_n$.

Each proportional solenoid valve 9 of each braking module 6 carried by each axle is supplied directly with compressed air from the corresponding feed reservoir 8 and pneumatically controls the brake actuators 7, preferably via the corresponding braking control and stabilization unit, in order to carry out the braking process.

As will be seen later, the braking process is divided between service braking and emergency braking modes.

The opening of the proportional solenoid valve 9, on which the intensity of the resultant braking depends, is a function of the braking command received by the proportional solenoid valve 9.

According to the invention, each proportional solenoid valve 9 can receive two types of braking command: a pneumatic command consisting of pneumatic pressure variations coming from a classical pneumatic control line 10 of the pneumatic braking assembly used, and an electric command via an electric control line 11 coming from the deceleration control unit UCD 12.

To initiate the braking process, the braking system 1 according to the invention comprises a manual element 13 located in the driver's cabin, which must be actuated by the driver to produce the braking command(s).

According to the example illustrated, this manual element 13 is preferably a brake pedal 14 intended to be actuated by the driver and whose position controls the braking.

The brake pedal 14 is a special one, because it has two operating stages that correspond to the braking ranges. The first range is that of deceleration-braking, called service braking, and is designed for normal public transport use. For example it corresponds to the first angular sector 15 of depression of the pedal 14, known as the comfort stroke CC.

The second range is the emergency braking range and corresponds for example to the second angular sector 16 of depression of the pedal 14, known as the emergency braking stroke CFU.

The brake pedal 14 can be replaced by a different manual element 13, for example operated by hand, an actuator of any type, one or more position sensors, or any other appropriate means.

Figure 5:
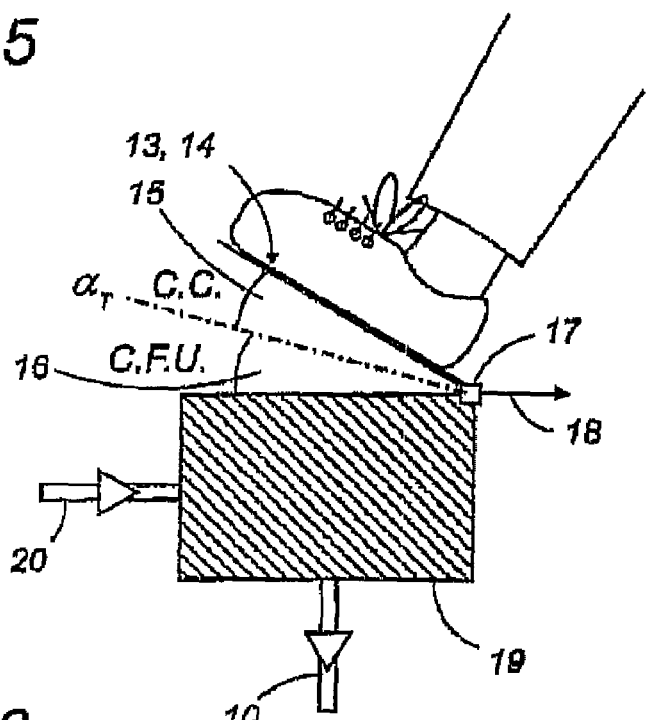
FIG. 5 is a diagrammatic view of the brake pedal.

Advantageously, when the manual element 13 is a pedal 14 as illustrated in FIG. 5, the driver can very easily, and with the same movement, change from one braking mode to the other, simply by depressing the pedal further.

The two operating stages of the pedal can advantageously be indicated to the driver by a difference in the stiffness of the pedal, preferably with a "hard point" indicating the transition zone between the two sectors and thus between the two braking ranges. If needs be, this indication can be supplemented by any other appropriate signalling means, such as a display on the instrument panel or an acoustic or visual signal.

The brake pedal 14 is a mechanical actuator which comprises an electric stage and a pneumatic stage for generating and transmitting the command corresponding to the two braking ranges.

In the first part of the stroke of the pedal 14, which corresponds to the first angular sector 15, the pneumatic control line 10 is not supplied with air.

The position of the manual element 13, preferably the pedal 14, is detected by one or more position sensors 17, preferably electronic sensors of angular position or of a magnitude which is a function of the angular position. The resulting information about the position is transmitted to the UCD unit 12 via an electric connection 18.

In the second part of the stroke, which corresponds to the second angular sector 16, a pneumatic box 19 is activated proportionally to the depression of the pedal 14, which generates a pneumatic command stemming from compressed air that comes from a supply line 20 and is sent via the pneumatic control line 10 to the braking modules 6 and their proportional solenoid valves 9. The braking force applied to the wheels by the brake actuators 7 is then proportional to this pneumatic command.

Figure 6:
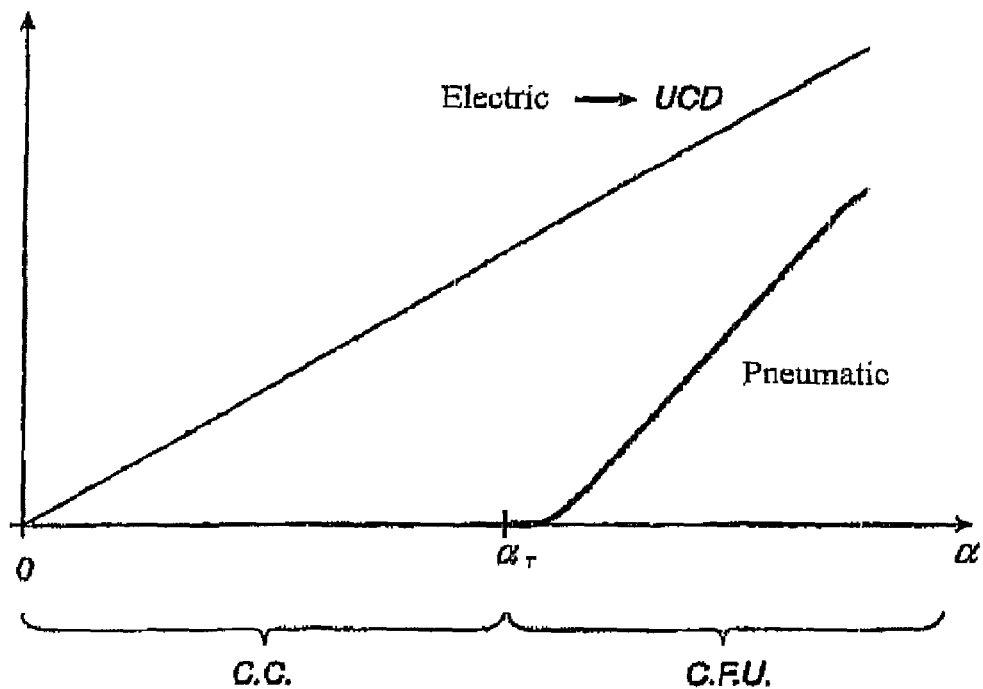
FIG. 6 is a graph showing the form of the command at the level of the brake pedal.

As can be seen from the graph of FIG. 6, during the comfort stroke CC corresponding to the first angular sector 15 only an electric signal related to the depression of the pedal is sent to the UCD unit 12.

From $angle_{\alpha T}$ onwards the pedal moves into its second angular sector and thus into the emergency braking range. A pneumatic command transmitted by the pneumatic control line 10 to the proportional solenoid valves 9 is then superimposed on the aforesaid electric signal going to the UCD unit 12.

The $value_{\alpha T}$ is any angular value suitable for the application considered, and can be for example of the order of 10°.

The deceleration control unit UCD 12 is a computer which controls the proportional solenoid valves EVP 9 as a function of the electric signal concerning the position of the pedal 14 received from the position sensors 17.

In accordance with a preferred embodiment of the invention, it also has several other particularly advantageous regulatory functions.

Figure 7:
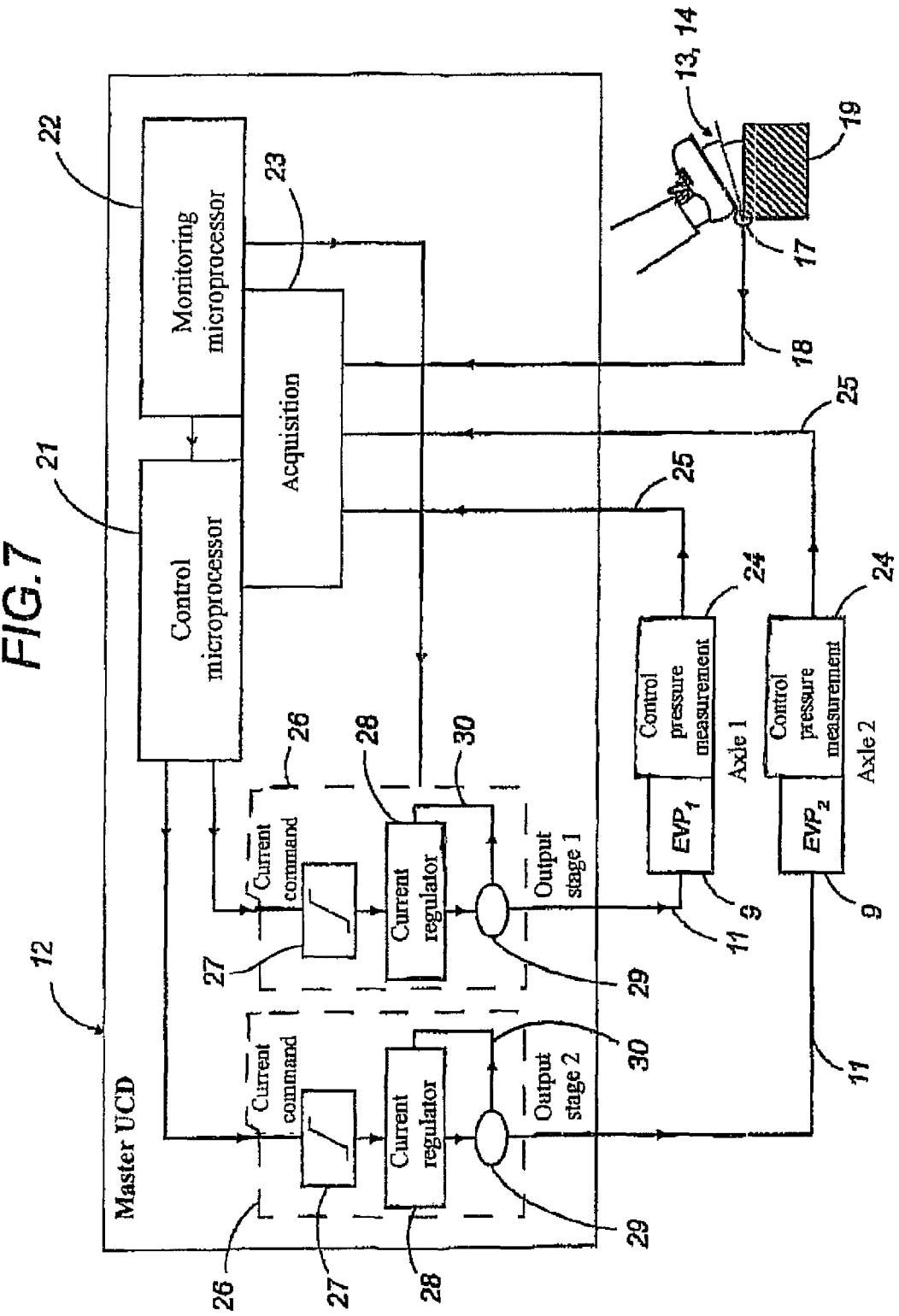
FIG. 7 is a block diagram of a deceleration control unit and its environment.

FIG. 7 illustrates the unit in more detail. The figure is a block diagram of a UCD unit, showing its main functional blocks.

The unit is a central electronic unit whose purpose is to ensure a deceleration that is proportional to the stroke of the pedal 14, by controlling the electrodynamic and pneumatic braking systems. Functional or diagnosis-dedicated data, such as the speed of the vehicle, the pneumatic control pressure and/or the pressure delivered by the solenoid valves EVP 9 to the brake actuators 7, can advantageously be exchanged between the various control/command systems of the vehicle.

According to the preferred embodiment illustrated, the UCD unit 12 comprises two microprocessors: a control microprocessor 21 which computes the electric braking command(s) to be emitted, and a monitoring microprocessor 22 which, for safety reasons, checks that the control microprocessor 21 is functioning correctly.

These two microprocessors are connected to an acquisition stage 23 which constitutes the input stage of the UCD unit. This acquisition stage receives the signals corresponding to the input values of the UCD and converts them into electronic signals that can be used by the microprocessors.

Thus, the acquisition stage 23 receives an electric signal coming from the position sensor(s) 17 that identify the position of the pedal 14. It can also receive signals coming from control loops, in particular a measurement of the pressure, produced by one or more sensors 24 located at or after the solenoid valves 9 and in each case transmitted by an electric connection 25.

As a function of the input data, the control microprocessor 21 computes the braking commands to be sent to the various braking modules 6 and sends them to the output stages 26.

The monitoring microprocessor 22 checks and validates what the control microprocessor 21 is doing. If it detects an anomaly or malfunction, it can act upon and/or block one or more output stages 26. In addition, it can call for a re-initialization and re-start of the control microprocessor 21.

The UCD unit 12 comprises at least one output stage 26 and preferably as many output stages 26 as there are braking modules 6 to be controlled in the vehicle, i.e. as many proportional solenoid valves EVP 9 as have to be controlled.

In the example illustrated there are two output stages 26, which correspond to two solenoid valves EVP 9. However, this example is in no way limiting.

Each of the output stages 26 is preferably controlled independently and can therefore send a different control value to each solenoid valve EVP 9. Thus, different braking can be obtained at each of the axles, which can be advantageous for various technical reasons, for example when the axles are not all identical or do not behave in the same way, or when the braking mechanisms have degrees of wear that differ from one axle to another.

Such independence also enables the control microprocessor 21 to compensate for any malfunction of one or more braking modules 6 by passing the braking command on to the other modules in order, nevertheless, to achieve effective overall braking of the vehicle.

Preferably, a pressure sensor 24 arranged at or after each solenoid valve EVP 9 sends a pressure measurement to the UCD unit, more particularly to its acquisition stage 23, via an electric line 25. This provides a pressure check that enables the control microprocessor 21 to control the actual braking taking place in order to adjust it to the control value required, since the relation between current and pressure is not very stable. Such a check also enables it to detect any malfunction at the level of the solenoid valve EVP 9 or its supply.

Each output stage 26 preferably comprises a jerk limitation filter 27, which restricts jerkiness and enables an output current signal with a gentle slope to be obtained, followed by a current regulator 28 that produces the current required in order to generate the electric command computed and send it to the electric control line 11.

This current regulator 28 is preferably followed by a current sensor 29 so as to create a current control loop 30 for adjusting the current produced to the value required.

Figure 1:
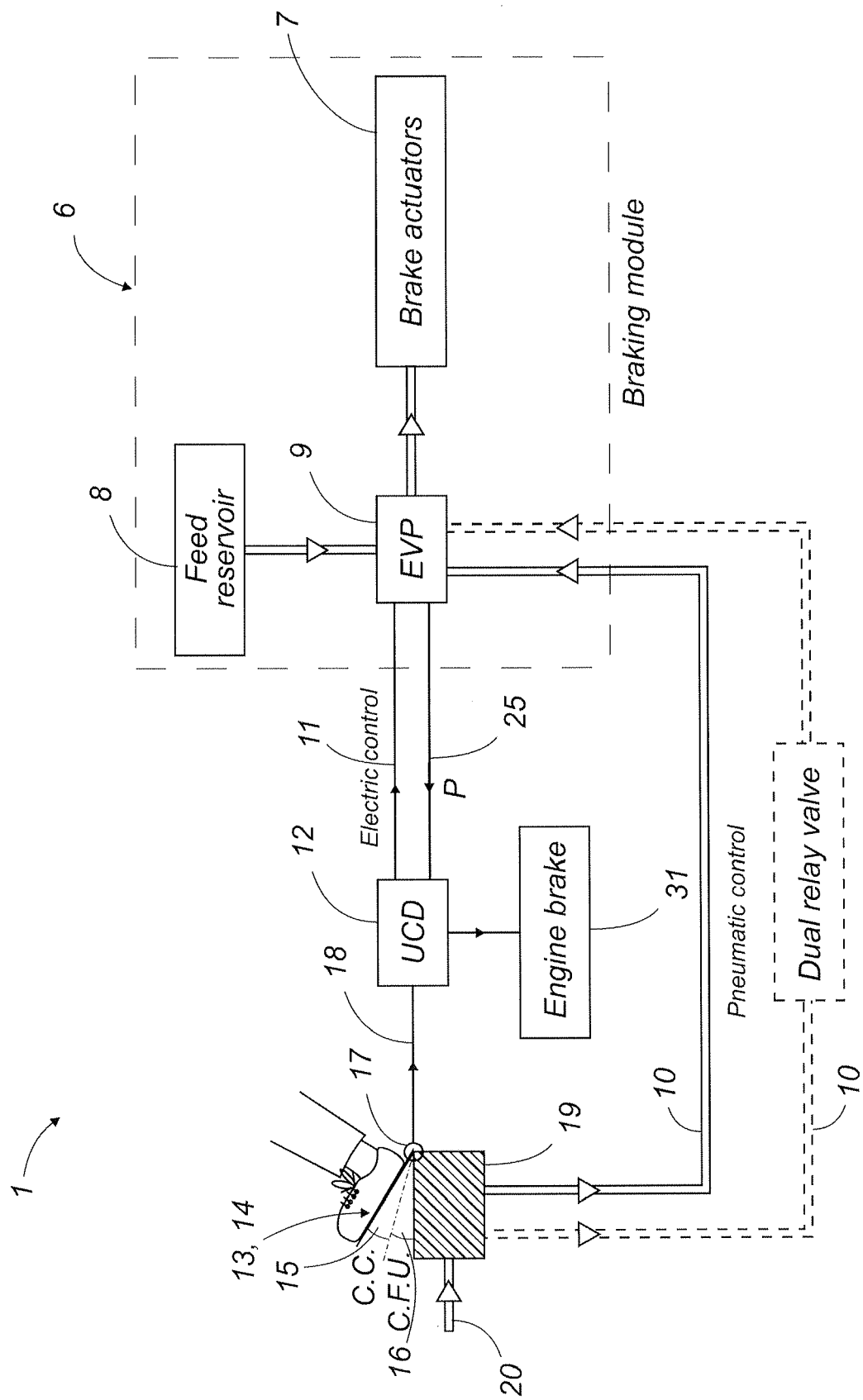
FIG. 1 is a simplified functional block diagram of the basic module of the braking system according to the invention.

The basic module of the braking system 1 according to the invention has been represented schematically as a whole in FIG. 1.

It comprises a pedal 14, its electronic position detector 17, its pneumatic box 19 and a pneumatic control line 10, a deceleration control unit UCD 12, an electric control line 11 and a proportional solenoid valve EVP 9.

Below, the operation of the braking system according to the invention will be described for this basic module.

Service Braking Range

This exists over the entire comfort stroke CC of the pedal 14 that corresponds to a pedal depression limited to the angular sector 15.

In this sector the pneumatic box 19 of the pedal is not active and the pneumatic control line 10 is not supplied.

The UCD unit 12 receives a signal or datum coming from the sensor(s) 17, informing it about the degree to which the pedal 14 has been depressed.

The UCD then calls for the braking of the vehicle by electrically controlling the electrodynamic braking and the electromechanical braking.

To bring about the braking called for, the UCD unit 12 gives priority to electrodynamic braking by the vehicle's motors, also known as engine braking 31. This type of braking has the advantage that it generates no wear of the brake elements. In addition, if necessary it enables the recovery of electrical energy that can be sent to the catenary or used to recharge the on-board batteries.

If the electrodynamic braking is faulty or when it turns out to be insufficient or unsuitable, for example when the speed is too low or when driving on an incline, the UCD unit 12 replaces it or preferably supplements it by electromechanical braking.

For this, it controls the opening of the proportional solenoid valve EVP 9 by sending it an electric command via the electric control line 11. The proportional solenoid valve EVP 9 then delivers air under pressure to the brake actuators 7 so as to supplement the braking and obtain the deceleration demanded by the driver.

The UCD unit 12 automatically manages the use of the engine brake, the pneumatic braking or both types of braking simultaneously. Advantageously, the choice and/or extent of braking are determined automatically and the system is totally transparent for the driver.

In addition, the UCD unit 12 generates a progressive braking which is optimized to ensure maximum passenger comfort. For this, as already mentioned the UCD unit 12 can comprise filter components which limit sudden jerks and the slope of the braking demanded, so making it possible to obtain gentle and comfortable driving. Thus, the braking system according to the invention provides the driver with real assistance for his driving.

In the service range all the braking commands are transmitted electrically. The response time of the braking system is therefore very short between actuation of the pedal 14 and effective braking.

Emergency Braking Range

Under normal vehicle operating conditions, i.e. under normal traffic, driving and operating conditions, the emergency braking range is not used and the driver decelerates and stops the vehicle with maximum passenger comfort by means of the service braking mode described above.

However, for safety reasons provision must additionally be made for supplementary braking possibility called emergency braking. This exists throughout the emergency braking stroke CFU that comes after the comfort stroke CC.

Such emergency braking is required when an unexpected reason compels the driver to call for more rapid and more effective braking than the service braking, for example when there is an unexpected obstacle in his path or if a malfunction of the service braking system and in particular the UCD unit 12 occurs.

For reasons of practical utility it can be advantageous to provide a device for registering the change to the emergency braking range, which cuts in from the end of the service braking range when passing through the "hard" point that corresponds to the limiting transition zone between the two stages, symbolized in the figures by the $\text{angle}_{aT}$.

Thanks to this registration an analysis of the reasons for using emergency braking can be carried out after the event and any malfunction of the service braking can be detected and repaired.

The emergency braking range must be completely reliable and safe. For that reason it uses the classical, pneumatically controlled pneumatic braking means which satisfy these criteria. In addition, it must be fast-acting and effective. The braking system according to the invention enables these latter characteristics to be improved.

Emergency braking extends over a certain range of angular displacements of the pedal 14, corresponding here to the angular sector 16.

Within this range the pedal 14 generates on the one hand an electric command via the UCD unit 12 and the electric connections 18 and 11, and on the other hand a pneumatic command circulating in the pneumatic control line 10.

The pneumatic command, which is reliable and safe, triggers the opening of the proportional solenoid valve EVP 9 and thus too the operation of the brake actuators 7.

For reasons of safety the pneumatic control line 10 can be duplicated. The pneumatic command can then, for example, get to the solenoid valve EVP 9 by passing through a dual relay valve that transmits whichever command has the greater intensity.

To improve the response time of the emergency braking system, a much more rapid electric command is also delivered to the UCD unit 12. The latter immediately initiates braking by the engine brake 31 if the situation so permits, and electromechanical braking by sending a rapid electric command via the electric control line 11 to the solenoid valve EVP 9.

The UCD unit 12 continues controlling the electric braking, while also maintaining electromechanical control until the value of the pneumatic command progressively replaces the electrodynamic braking.

Even in this emergency stroke CFU, the UCD unit 12 participates in controlling the intensity of braking and, in accordance with an internal law, adds an electric command value as a function of the final braking pressure to be obtained, taking into account the pneumatic braking pressure command delivered to the proportional solenoid valve EVP 9. However, under no circumstances can the UCD unit 12 via the electric control line 11, reduce the braking demanded by the pneumatic control line 10.

The superimposition and conjunction of these two commands in the solenoid valve EVP 9 enables progressive and virtually immediate braking of optimum efficacy.

Figure 8:
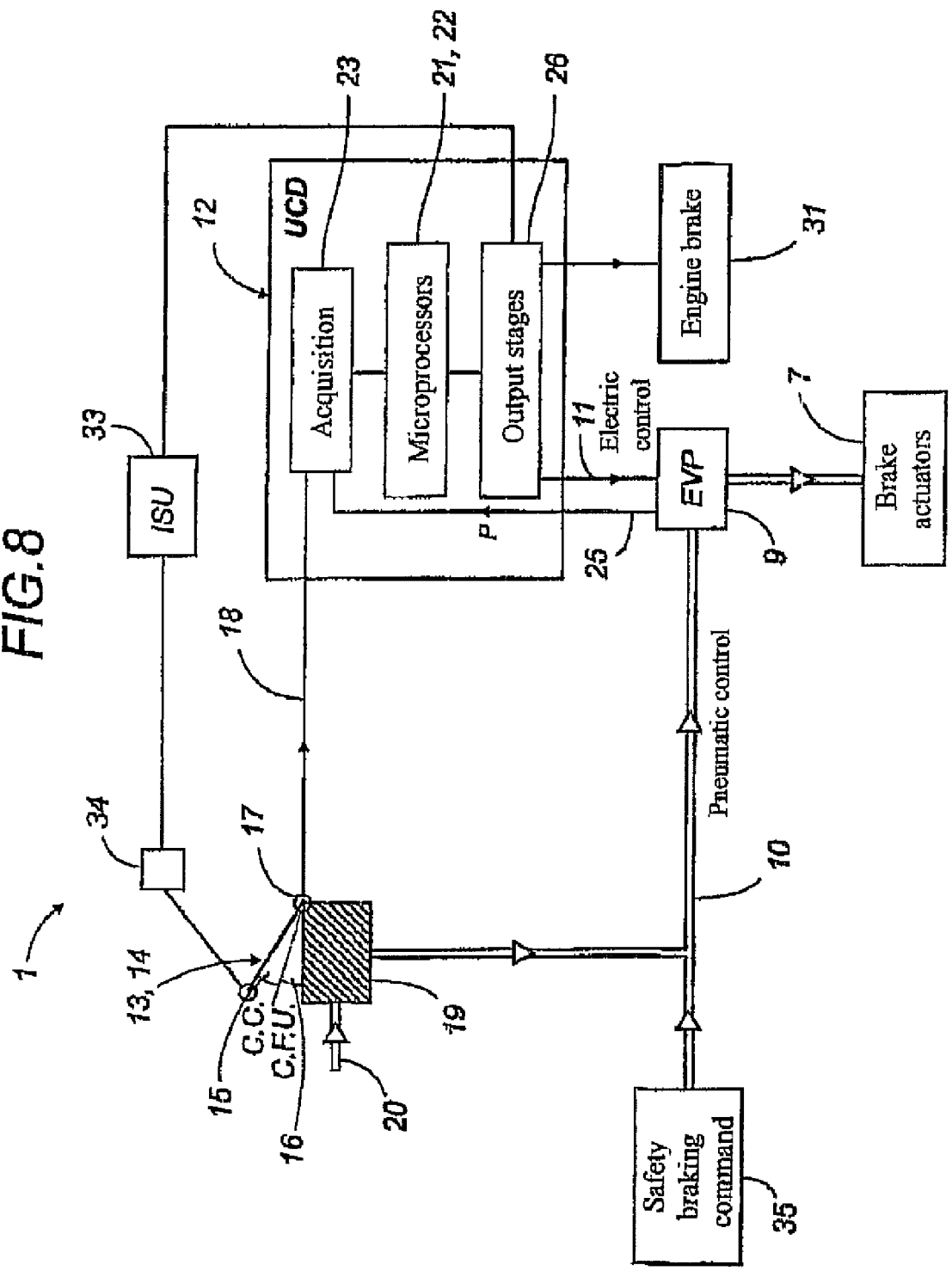
FIG. 8 is a general functional block diagram of an example basic module of the braking system according to the invention, equipped with a supplementary safety device of the UCD output inhibitor type.

To improve the reliability of the braking system according to the invention, a supplementary safety device can be added to it, which is represented schematically in FIG. 8 and which, in certain situations, enables at least one output of the deceleration control unit 12 to be blocked with the help of means known as a UCD output inhibitor or ISU 33.

As indicated earlier, the UCD unit is an electronic unit managed entirely by software. By its nature, therefore, it cannot be perfectly safe despite the precautions adopted, such as the use of the monitoring microprocessor 22.

In the event of any malfunction the UCD unit 12 could generate undesired braking commands and so bring about braking at the wrong time, which might be dangerous.

In effect, if the deceleration control unit 12 generated an undesired, large braking command, it could cause an abrupt deceleration of the vehicle which would be very uncomfortable for the passengers and could even entail a risk of falling or injury.

On the other hand, if the UCD unit 12 generated a braking command of low intensity but long duration, it could give rise to slight braking which would be unnoticed by the driver. Owing to its continuous character such braking can give rise to heating of the brake elements, which could cause the start of a fire.

Advantageously, the UCD output inhibitor 33 enables the feed to one or more output stages 26 of the UCD unit 12 to be cut off. Thus, in the event of UCD unit 12 malfunction, even if the microprocessors 21 and 22 generate ill-timed braking commands, these are not converted into electric braking commands sent to the solenoid valve EVP 9 via the electric control line 11.

For this, the supplementary safety system comprises a sensor 34 which detects whether or not the driver is actuating the manual element 13, preferably the pedal 14.

The sensor 34 also performs the function of an electric switch with two conditions depending on the position of the manual element 13 detected.

The first condition of this switch corresponds to the rest position of the manual element 13, i.e. the position which the manual element 13 adopts when the driver of the vehicle does not require any braking.

As soon as the manual element 13 leaves its rest position, the switch changes over to its second condition. This second condition corresponds to an active position of the manual element 13 by virtue of which the driver is calling for braking to take place, regardless of the intensity of the braking demand.

The sensor 34 is connected to the UCD output inhibitor or ISU 33, and by virtue of its electrical condition, transmits to it a datum on the position of the manual element 13.

Depending on the condition of the switch, the UCD output inhibitor or ISU 33 cuts off or lets through the electric feed to the output stages 26 of the UCD unit 12.

When the switch is in its first condition corresponding to the rest position of the manual element 13, the ISU 33 blocks the feed to the output stages 26 of the UCD 12. Thus, and even if the microprocessors are generating undesired commands because of a malfunction of the UCD unit 12, no electric braking command can be delivered to the solenoid valve EVP 9 in the absence of a braking demand by the driver.

Thus, the braking system according to the invention is perfectly safe.

When the driver actuates the manual element 13 to call for braking, the switch of the sensor 34 changes over to its second condition and the ISU 33 re-establishes the feed to the output stages 26 of the UCD unit 12. The UCD unit 12 can then send to the solenoid valve EVP 9 an electric braking command adapted in accordance with the principle described earlier.

Preferably, the UCD output inhibitor 33 also re-establishes the feed to the output stages 26 of the UCD unit 12 when the vehicle is at rest.

Several variants of this device can easily be imagined.

For example, the sensor 34 can be independent of, or combined with the position sensor 17 of the manual element 13 that serves to transmit to the acquisition stage 23 of the UCD unit 12, via the line 18, a datum concerning the position of the manual element 13.

According to another conceivable variant, the switch function can be dissociated from the sensor 34. In that case an independent switch has to be added.

The sensor 34 can on the other hand be independent of, or integrated with the UCD output inhibitor 33. Similarly, the ISU 33 can be separate from, or integrated with the UCD unit 12.

According to another preferred embodiment of the invention, the UCD output inhibitor 33 can advantageously only control the feed to the output stages 26 of the UCD unit 12 connected to the solenoid valve(s) EPV 9, and not to the output stage that controls the engine brake 31.

Thus, the ISU 33 prevents braking operations that might be dangerous, but not the safe electrodynamic braking by the engine brake 31. This makes it possible to preserve the function of automatic braking by the engine brake, as for example automatic braking before bends if the speed of the vehicle is too high.

These functions, not called for by the driver, must take place even if the manual element 13 is in its rest position and thus while the ISU 33 has cut off the feed to the output stages 26 of the UCD unit 12 connected to the solenoid valves EPV 9.

In addition to the position of the manual element 13, other conditions can preferably actuate the UCD 33 output inhibitor and hence give rise to the feeding or the disconnection of one or more of the output stages 26 of the UCD unit 12.

One of these conditions is, in particular, the existence of a safety braking command 35. In certain circumstances, for example in the event that one of the vehicle's doors opens, or the steering system becomes detached, or the driver is taken ill, or the emergency stop device is actuated manually, an emergency braking command 35 is sent to the vehicle's braking system. The resultant braking must be completely reliable and for that purpose a pneumatic braking command is used.

To increase the reliability of the system still further, the ISU 33 device preferably cuts off the feed to the output stages 26 of the UCD unit 12 when an emergency braking operation is called for, in order to permit only the completely reliable, pneumatically controlled pneumatic braking device to operate, thereby guaranteeing the maximum safety level required.

Those with knowledge of the field will be able to imagine other variants of this safety device, in particular for example an ISU 33 device which controls the feeding of the UCD unit 12 as a whole and no longer solely one or more of its output stages 26.

Figure 2:
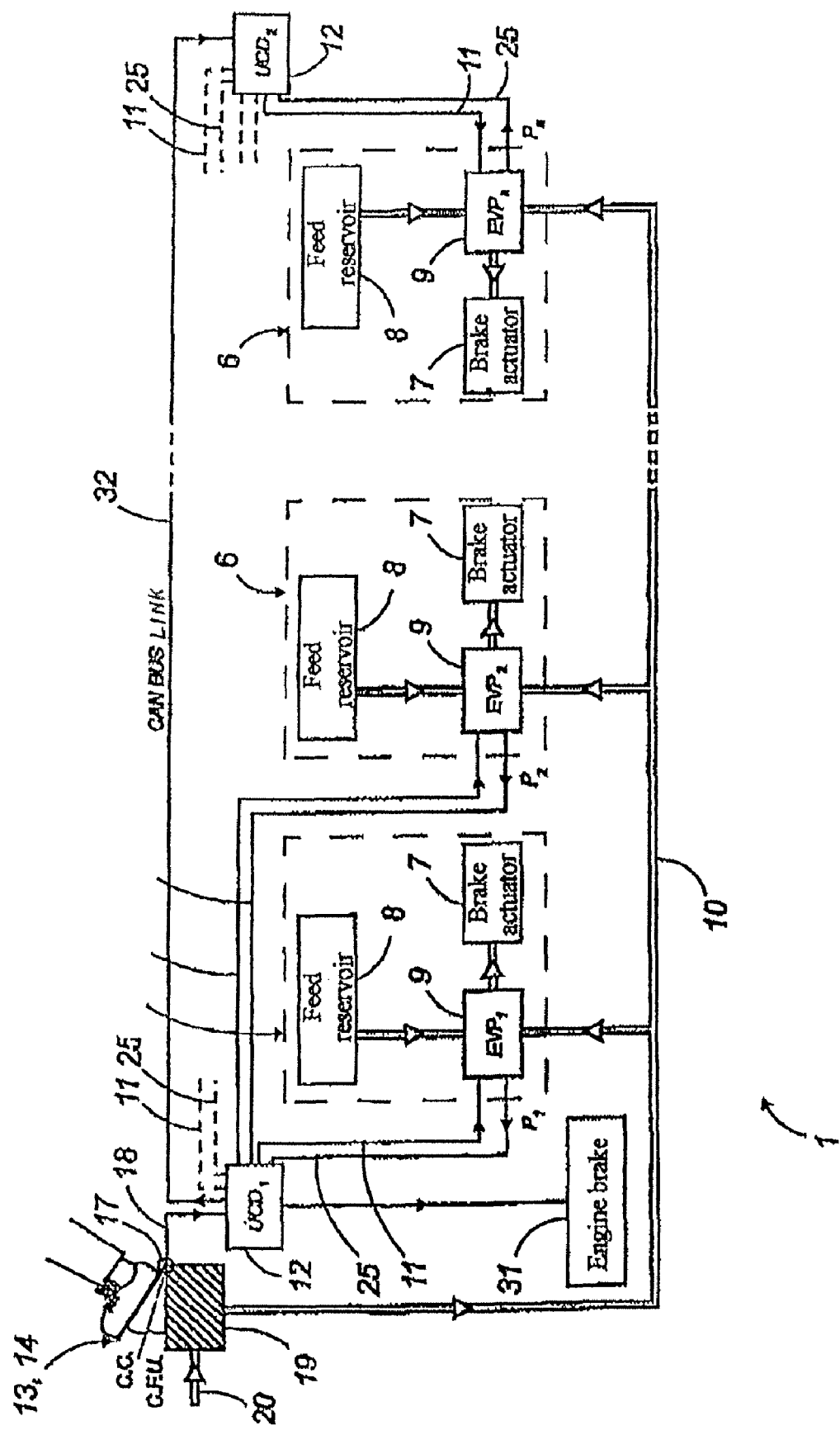
FIG. 2 is a general functional block diagram of an example braking system according to the invention, comprising a plurality of braking modules.

The braking system according to the invention can advantageously be applied to a multi-axle vehicle, for example a multi-axle road train 2 for public transport, as illustrated by way of example in FIGS. 2 to 4.

The braking system according to the invention then comprises several braking modules 6, preferably one for each axle, each comprising a proportional solenoid valve EVP 9 connected to a feed reservoir 8, whether common or independent, and brake actuators 7.

The solenoid valve EVP 9 of each of these braking modules 6 is connected pneumatically to the pneumatic box 19 of the pedal 14 by a pneumatic control line 10, which can be single or duplicated and in the latter case comprises at least one dual relay valve.

It is also connected electrically to a UCD unit 12 by an electric control line 11 specific to each solenoid valve EVP 9. Each solenoid valve EVP 9 is preferably connected to the UCD unit 12 by an additional, specific electric connection 25 enabling the pressure control described earlier to be carried out.

The operation of these braking modules 6 is similar to that of the basic module described in detail earlier, and the UCD unit 12 can in addition manage independently the operation of each of these modules 6 to obtain the overall braking behavior that is most suitable and most effective.

When the vehicle is long and comprises numerous braking modules 6, pneumatic control takes a relatively long time to propagate along the pneumatic control line 10 from one end of the vehicle to the other. The problem of response time then becomes crucial.

In that it provides a satisfactory response to that problem, the braking system according to the invention becomes particularly advantageous for each application. In effect, the UCD unit 12 sends a rapidly propagated electric command to all the proportional solenoid valves EVP 9 that act all at the same time and much more quickly than the pneumatic command. The pneumatic command is added progressively to the electric command at the rate of its arrival. The braking efficacy is thus greatly improved and the wear of the brake elements is better distributed.

To limit the number of electric connections emerging from and leading to the UCD unit 12, it is advantageous to use a plurality of UCD units 12 indexed $UCD_1$, $UCD_2$ ..., distributed along the train 2. In effect, a duplicate electric line 11 and 25 must exist between the UCD unit 12 and each proportional solenoid valve EVP 9. These deceleration control units UCD are preferably interconnected by a BUS connection 32, for example operating in accordance with the CAN protocol.

Thus, it is preferable to use two UCD units 12 positioned one at each end of the vehicle. The unit $UCD_1$ located at the head of the train 2 receives data from the pedal 14, and preferably serves as the master unit. It directly controls the first half of the braking modules 6, located toward the front of the vehicle.

The second unit $UCD_2$ is a slave unit which receives its instructions from the master unit $UCD_1$, preferably via a BUS 32 connection, for example operating in accordance with the CAN protocol. It then controls the second half of the braking modules 6 located at the rear of the vehicle.

Nevertheless, the distribution of the braking modules 6 between the UCD units 12 can be different, depending on the various technical constraints specific to each application.

Public transport trains often have a head module 3 at each end, so that they can move in both directions without having to make a U-turn. These head modules 3 each have a driver's console with a brake pedal 14.

As shown in FIG. 3, the braking system according to the invention can then advantageously comprise a UCD unit 12 in each head module, which receives data from the pedal 14 concerned and is connected to the other UCD unit, preferably via a BUS 32 connection, for example operating according to the CAN protocol.

In this case the two UCD units 12 are identical and can play in alternation the respective parts of master or slave, depending on the driving console in use.

The examples illustrated comprise two UCD units, but cases are conceivable in which just one unit, or three units, or even more are used.

According to a preferred embodiment of the invention, one of these deceleration control units UCD 12 receives the information about the position of the manual element 13 and serves as the master unit for the other UCD units 12, which are slave units.

Thus, it can for example be envisaged to use one simplified UCD unit per braking module 6 and therefore per axle, these UCD slave micro-units then serving as respective interfaces between a master UCD unit 12 that receives the data concerning the position of the manual element 13, and each of the proportional solenoid valves EVP 9.

The invention is clearly not limited to the preferred embodiments described above and illustrated in the various figures, and those with knowledge of the field will be able to modify it in many ways and imagine other variants without going beyond either the range, or the context of the invention.

The invention claimed is:

1. An electromechanically controlled braking system, for multi-axle road vehicles, comprising for each axle a pneumatic braking module (6) connected to a feed reservoir (8) containing brake-actuating gas and comprising brake actuation elements (7), the braking system comprising:
   a manual element (13) with two operating stages corresponding to a service braking mode and to an emergency braking mode, which is manually actuated to initiate a braking process and a position of the manual element (13) determines an intensity of the braking required;
   a proportional solenoid valve (EVP 9) for each braking module (6) which, when the manual element (13) is actuated, receives at least one of an electric braking command and a pneumatic braking command, and an opening of the proportional solenoid valve (EVP 9), which is proportional to the at least one of the electric and the pneumatic braking commands received, brings the brake actuation elements (7) into communication with the feed reservoir (8) so as to produce a required braking force;
   at least one deceleration control unit (UCD 12), which receives information of the position of the manual element (13) and, from that received information when the manual element (13) has been actuated, generates the electric braking command for controlling opening of the proportional solenoid valves (EVP 9) electrically;
   an electric control line (11) for each braking module (6), which forms an electric connection between the deceleration control unit (UCD 12) and each of the proportional solenoid valves (EVP 9) and enables transmission of the electric braking command;
   a pneumatic control line (10), which forms a pneumatic connection between the manual element (13) and the proportional solenoid valves (EVP 9) and enables transmission of the pneumatic braking command generated by the manual element (13), only during the emergency braking mode; and
   a deceleration control unit output inhibitor (ISU 33), which enables at least one output of the deceleration control unit (UCD 12) to be blocked when at least one of the manual element (13) is in a rest position and in the event of a safety braking command (35).

2. The electromechanically controlled braking system according to claim 1, wherein the deceleration control unit (UCD 12) also controls electrodynamic braking by a motor of the vehicle which provide engine braking (31).

3. The electromechanically controlled braking system according to claim 2, wherein the deceleration control unit (UCD 12) gives priority to the engine braking (31) and, if necessary, if the engine brake (31) is one of insufficient and ineffective, one of supplements and replaces the engine braking (31) by pneumatic braking.

4. The electromechanically controlled braking system according to claim 1, wherein the manual element (13) is a brake pedal (14).

5. The electromechanically controlled braking system according to claim 4, wherein the two operating stages of the pedal (14) correspond to two successive angular depression sectors (15, 16) of the pedal (14).

6. The electromechanically controlled braking system according to claim 4, wherein the two operating stages of the pedal (14) are indicated to the driver by a difference in a stiffness of the pedal (14).

7. The electromechanically controlled braking system according to claim 1, further comprising a device for registering a change to the emergency braking mode.

8. The electromechanically controlled braking system according to claim 1, further comprising at least one position sensor (17) which detects the position of the manual element (13) and transmits information, to the deceleration control unit (UCD 12), concerning the position of the manual element (13).

9. The electromechanically controlled braking system according to claim 1, wherein each braking module (6) is connected to an independent feed reservoir (8) of a brake-actuating gas.

10. The electromechanically controlled braking system according to claim 9, wherein each of the independent feed reservoirs (8) is filled with compressed air supplied by a common generator.

11. The electromechanically controlled braking system according to claim 1, wherein at least one of the braking modules (6) also comprises a braking control and stabilization unit.

12. The electromechanically controlled braking system according to claim 1, further comprising a pressure sensor (24) which is either located at or after each proportional solenoid valve (EVP 9), and the pressure sensor (24) sends a pressure measurement to the deceleration control unit (UCD 12), via an electric line (25), so as to enable pressure control.

13. The electromechanically controlled braking system according to claim 1, wherein the deceleration control unit output inhibitor(ISU 33) either cuts off or permits at least one of electric feeding of the deceleration control unit (UCD 12) and an output stage (26) of the deceleration control unit (UCD 12).

14. The electromechanically controlled braking system according to claim 1, wherein the deceleration control unit output inhibitor (ISU 33) does not block engine braking (31) controlled by the deceleration control unit (UCD 12).

15. The electromechanically controlled braking system according to claim 1, further comprising a sensor (34) for detecting whether the manual element (13) is in one of an active and the rest position and functions as a two-condition electric switch whose condition depends on whether the manual element (13) is in one of the active and the rest position.

16. The electromechanically controlled braking system according to claim 1, further comprising at least two deceleration control units (UCD 12) connected to one another by a BUS connector (32).

17. The electromechanically controlled braking system according to claim 16, wherein a first of the at least two deceleration control units (UCD 12) receives the information of the position of the manual element (13) and serves as a master unit for at least one other of the at least two deceleration control units (UCD 12) which is a slave unit.

18. The electromechanically controlled braking system according to claim 17, further comprising a deceleration control unit (UCD 12) at each end of the vehicle which alternatively serve as one of the master unit and the slave unit depending on a direction of travel of the vehicle.

19. The electromechanically controlled braking system according to claim 17, further comprising a master deceleration control unit (UCD) which receives the information of the position of the manual element (13), and a simplified, slave deceleration control unit (UCD) for each braking module (6), which serves as an interface between the master deceleration control unit (UCD) and each of the proportional solenoid valves (EVP 9).

20. An electromechanically controlled braking system, for multi-axle road vehicles, comprising a pneumatic braking module (6), for each axle, being connected to a feed reservoir (8) containing brake-actuating gas and comprising brake actuation elements (7), the braking system comprising:
- a manual element (13) with two operating stages corresponding to a service braking mode and to an emergency braking mode, the manual element (13) being manually actuated to initiate a braking process and a position of the manual element (13) determines an intensity of the braking required;
- a proportional solenoid valve (EVP 9) for each braking module (6) which, when the manual element (13) is actuated, receives at least one of an electric braking command and a pneumatic braking command, and an opening of the proportional solenoid valve (EVP 9), which is proportional to the at least one of the electric and the pneumatic braking commands received, brings the brake actuation elements (7) into communication with the feed reservoir (8) so as to produce a required braking force;
- at least one deceleration control unit (UCD 12), which receives information of the position of the manual element (13) and, from that received information when the manual element (13) has been actuated, generates the electric braking command for controlling opening of the proportional solenoid valves (EVP 9) electrically;
- an electric control line (11) for each braking module (6), which forms an electric connection between the deceleration control unit (UCD 12) and each of the solenoid valves (EVP 9) and enables transmission of the electric braking command;
- a pneumatic control line (10), which forms a pneumatic connection between the manual element (13) and the solenoid valves (EVP 9) and enables transmission of the pneumatic braking command generated by the manual element (13), only during the emergency braking mode;
wherein the deceleration control unit (UCD 12) comprises:
- an acquisition stage (23) which forms an input stage of the deceleration control unit (UCD 12) and receives information concerning the position of the manual element (13);
- a control microprocessor (21) for computing the electric braking command to be sent;
- a monitoring microprocessor (22) for monitoring the control microprocessor (21); and
- at least one output stage (26), which comprises a current regulator (28), for producing and transmitting the computed electric braking command to the electric control line (11).

21. The electromechanically controlled braking system according to claim 20, wherein the output stage (26) also comprises a jerk limitation filter (27) and a current sensor (29) which form a current control loop (30).

22. The electromechanically controlled braking system according to claim 20, wherein the deceleration control unit (UCD 12) comprises as many output stages (26) as there are braking modules (6) to be controlled, and each of these output stages (26) is independently controlled.

* * * * *